United States Patent
Ulrey (10) Patent No.: US 10,221,779 B2
(45) Date of Patent: Mar. 5, 2019

(54) SYSTEM AND METHOD FOR PROVIDING EGR TO AN ENGINE

(71) Applicant: Ford Global Technologies, LLC, Dearborn, MI (US)

(72) Inventor: Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 15/382,567

(22) Filed: Dec. 16, 2016

(65) Prior Publication Data

US 2018/0171885 A1 Jun. 21, 2018

(51) Int. Cl.
| | |
|---|---|
| F02D 13/00 | (2006.01) |
| F02D 13/02 | (2006.01) |
| F02M 26/17 | (2016.01) |
| F02M 26/23 | (2016.01) |
| F01L 1/047 | (2006.01) |
| F02D 41/00 | (2006.01) |

(52) U.S. Cl.
CPC .......... *F02D 13/0249* (2013.01); *F01L 1/047* (2013.01); *F02D 13/0215* (2013.01); *F02D 13/0273* (2013.01); *F02D 13/0276* (2013.01); *F02D 41/005* (2013.01); *F02D 41/0065* (2013.01); *F02D 41/0077* (2013.01); *F02M 26/17* (2016.02); *F02M 26/23* (2016.02); *F02D 2200/1002* (2013.01)

(58) Field of Classification Search
CPC ..... F02B 33/00; F02M 26/22; F02D 13/0249; F02D 13/0261; F02D 13/0273; F02D 13/0276; F02D 13/0284
See application file for complete search history.

(56) References Cited

U.S. PATENT DOCUMENTS

| | | | | |
|---|---|---|---|---|
| 3,591,958 A | * | 7/1971 | Nebgen | F02B 75/02 123/311 |
| 4,282,845 A | * | 8/1981 | Nohira | F02B 21/00 123/433 |
| 4,732,118 A | * | 3/1988 | Tanahashi | F02M 26/01 123/568.14 |
| 4,815,423 A | * | 3/1989 | Holmer | F01L 13/0015 123/90.6 |
| 5,133,309 A | * | 7/1992 | Ishii | F02B 1/08 123/184.52 |

(Continued)

OTHER PUBLICATIONS

Ulrey, Joseph Norman, et al., "Systems and Methods for a Split Exhause Engine System," U.S. Appl. No. 15/382,477, filed Dec. 16, 2016, 109 pages.

(Continued)

*Primary Examiner* — Thomas Moulis
(74) *Attorney, Agent, or Firm* — Julia Voutyras; McCoy Russell LLP (57) ABSTRACT

Methods and systems are provided for providing exhaust gas recirculation to a naturally aspirated internal combustion engine. In one example, exhaust gas is recirculated to an engine intake via a dedicated scavenging manifold and a scavenging exhaust valve. The exhaust gas and fresh air that has not participated in combustion may be recirculated to engine cylinders even at high engine loads since the exhaust gas and fresh air is returned to the engine air intake at a pressure greater than atmospheric pressure.

19 Claims, 6 Drawing Sheets

(56) References Cited

U.S. PATENT DOCUMENTS

| | | | | |
|---|---|---|---|---|
| 6,321,717 | B1* | 11/2001 | Faletti | F02D 13/04 123/321 |
| 6,742,506 | B1* | 6/2004 | Grandin | F02B 37/00 123/568.12 |
| 7,308,872 | B2* | 12/2007 | Sellnau | F01L 1/185 123/90.16 |
| 8,069,663 | B2 | 12/2011 | Ulrey et al. | |
| 8,479,511 | B2 | 7/2013 | Pursifull et al. | |
| 8,495,992 | B2 | 7/2013 | Roth | |
| 8,511,084 | B2 | 8/2013 | Ulrey et al. | |
| 8,539,770 | B2 | 9/2013 | Williams | |
| 8,601,811 | B2 | 12/2013 | Pursifull et al. | |
| 8,701,409 | B2 | 4/2014 | Pursifull et al. | |
| 9,062,598 | B2* | 6/2015 | Inoue | F02D 13/0276 |
| 9,080,523 | B1 | 7/2015 | Ulrey et al. | |
| 9,261,051 | B2 | 2/2016 | Ulrey et al. | |
| 9,534,567 | B2 | 1/2017 | Ulrey et al. | |
| 9,765,658 | B2* | 9/2017 | Knauf | F01L 13/0021 |
| 9,845,713 | B2* | 12/2017 | Ernest | F01L 13/0036 |
| 9,874,169 | B2* | 1/2018 | Nagatsu | F02D 41/123 |
| 9,945,296 | B2* | 4/2018 | Tsukahara | F02D 13/0261 |
| 2004/0134449 | A1* | 7/2004 | Yang | F02B 1/12 123/27 R |
| 2005/0000498 | A1* | 1/2005 | Persson | F01L 1/18 123/568.14 |
| 2005/0066920 | A1* | 3/2005 | Daigo | F01L 1/267 123/90.16 |
| 2005/0081836 | A1* | 4/2005 | Winsor | F02B 31/085 123/568.14 |
| 2005/0252464 | A1* | 11/2005 | Aikawa | F02B 77/085 123/58.8 |
| 2005/0284435 | A1* | 12/2005 | Baeuerle | F01L 1/08 123/90.65 |
| 2006/0005818 | A1* | 1/2006 | Kuo | F02D 13/0207 123/568.13 |
| 2006/0016421 | A1* | 1/2006 | Kuo | F02D 13/0215 123/299 |
| 2008/0127952 | A1* | 6/2008 | Hatamura | F01N 13/107 123/568.11 |
| 2008/0223321 | A1* | 9/2008 | Methley | F01L 1/08 123/90.16 |
| 2009/0018747 | A1* | 1/2009 | Nitta | F01L 1/08 701/102 |
| 2009/0173062 | A1* | 7/2009 | Hu | F01N 3/023 60/295 |
| 2010/0139268 | A1* | 6/2010 | Huber | F02B 29/0475 60/602 |
| 2011/0126519 | A1* | 6/2011 | Okada | F02D 13/0246 60/276 |
| 2011/0219767 | A1* | 9/2011 | Miyashita | F01L 1/185 60/600 |
| 2013/0037002 | A1* | 2/2013 | Kemeny | F01L 1/08 123/434 |
| 2013/0167508 | A1* | 7/2013 | Nishimura | F01N 9/002 60/274 |
| 2015/0083073 | A1* | 3/2015 | Nagatsu | F02D 41/3035 123/294 |
| 2015/0114342 | A1* | 4/2015 | Iwai | F02D 21/08 123/305 |
| 2015/0128890 | A1* | 5/2015 | Cecur | F01L 1/185 123/90.16 |
| 2015/0316005 | A1 | 11/2015 | Madison et al. | |

OTHER PUBLICATIONS

Ulrey, Joseph Norman, et al., "Systems and Methods for a Split Exhaust Engine System," U.S. Appl. No. 15/382,457, filed Dec. 16, 2016, 109 pages.

Leone, Thomas G., et al., "Systems and Methods for a Split Engine System," U.S. Appl. No. 15/382,489, filed Dec. 16, 2016, 109 pages.

Ulrey, Joseph Norman, et al., "Systems and Methods for a Split Exhaust System," U.S. Appl. No. 15/382,458, filed Dec. 16, 2016, 112 pages.

Ulrey, Joseph Norman, et al., "Systems and Methods for a Split Exhaust Engine System," U.S. Appl. No. 15/382,484, filed Dec. 16, 2016, 112 pages.

Ulrey, Joseph Norman, et al., "Systems and Methods for a Split Exhaust Engine System," U.S. Appl. No. 15/382,504, filed Dec. 16, 2016, 112 pages.

Ulrey, Joseph Norman, et al., "Systems and Methods for a Split Exhaust Engine System," U.S. Appl. No. 15/382,494, filed Dec. 16, 2016, 109 pages.

Ulrey, Joseph Norman, et al., "Systems and Methods for a Split Exhaust Engine System," U.S. Appl. No. 15/382,520, filed Dec. 16, 2016, 109 pages.

Ulrey, Joseph Norman, et al., "Systems and Methods for a Split Exhaust Engine System," U.S. Appl. No. 15/382,520, filed Dec. 16, 2016, 111 pages.

Boyer, Brad Alan, et al., "Systems and Methods for a Split Exhaust Engine System," U.S. Appl. No. 15/382,538, filed Dec. 16, 2016, 112 pages.

Ulrey, Joseph Norman, et al., "Systems and Methods for a Split Exhaust Engine System," U.S. Appl. No. 15/382,556, filed Dec. 16, 2016, 112 pages.

Ulrey, Joseph Norman, et al., "Systems and Methods for a Split Exhaust Engine System," U.S. Appl. No. 15/382,549, filed Dec. 16, 2016, 113 pages.

Ulrey, Joseph Norman, et al., "Systems and Methods for a Split Exhause Engine System," U.S. Appl. No. 15/382,479, filed Dec. 16, 2016, 111 pages.

Ulrey, Joseph Norman, et al., "Systems and Methods for a Split Exhause Engine System," U.S. Appl. No. 15/382,509, filed Dec. 16, 2016, 109 pages.

Ulrey, Joseph Norman, et al., "Systems and Methods for a Split Exhause Engine System," U.S. Appl. No. 15/382,532, filed Dec. 16, 2016, 111 pages.

Ulrey, Joseph Norman, et al., "Systems and Methods for a Split Exhause Engine System," U.S. Appl. No. 15/382,548, filed Dec. 16, 2016, 111 pages.

Ulrey, Joseph Norman, et al., "Systems and Methods for a Split Exhause Engine System," U.S. Appl. No. 15/382,559, filed Dec. 16, 2016, 112 pages.

Ulrey, Joseph Norman, et al., "Systems and Methods for a Split Exhause Engine System," U.S. Appl. No. 15/382,485, filed Dec. 16, 2016, 109 pages.

Ulrey, Joseph Norman, et al., "Systems and Methods for a Split Exhause Engine System," U.S. Appl. No. 15/382,506, filed Dec. 16, 2016, 109 pages.

* cited by examiner

SYSTEM AND METHOD FOR PROVIDING EGR TO AN ENGINE

FIELD

The present description relates generally to methods and systems for recirculating exhaust gas to cylinders of a naturally aspirated internal combustion engine.

BACKGROUND/SUMMARY

A naturally aspirated internal combustion engine may include exhaust gas recirculation (EGR) to reduce engine pumping work and NOx emissions. Exhaust gases may be returned to an engine's intake manifold when intake manifold pressure is lower than exhaust manifold pressure. The lower intake manifold pressure provides a motive force to draw exhaust gas from the exhaust manifold to the intake manifold. A naturally aspirated internal combustion engine may be configured with intake valves that close late in a compression stroke of a cylinder such that a portion of charge in the cylinder (e.g., air and fuel) may be pushed back into the engine's intake manifold. By pushing a portion of charge back into the engine intake manifold, the engine may be operated at a higher intake manifold pressure, thereby reducing engine pumping work. However, late intake valve closing may make it more difficult to flow a desired amount of EGR to engine cylinders since a smaller pressure differential may exist between the engine intake manifold and the engine exhaust manifold. Further, late intake valve closing has two effects on engine knock, one positive effect, one negative effect. Late intake valve closing reduces the engine's effective compression ratio which reduces compression heating, but this benefit may be offset by heating of the charge pushed back into the intake, the charge heated via cylinder walls, the cylinder head, and heat from the piston. Therefore, it would be desirable to provide an engine that has the advantages of late intake valve timing and EGR without the disadvantage of pushback charge warming.

The inventor herein has recognized potential issues with such systems and has developed a method that may lower an engine's propensity to knock while reducing engine NOx emissions and engine pumping work. In particular, the inventor has provided an engine method comprising: ejecting a second portion of exhaust gas from combustion in the cylinder during the cycle to a scavenge manifold at a first time, the cylinder included in a naturally aspirated engine; and ejecting fresh air from the cylinder to the scavenge manifold during the cycle of the cylinder at a second time, the second time different from the first time.

By ejecting exhaust gas and fresh air from a cylinder to a scavenge manifold, it may be possible to push fresh air and exhaust gas to an engine intake manifold so that cooled EGR may be provided to engine cylinders. The cooled EGR may reduce NOx, and pushing fresh air back into the intake manifold may allow the engine to operate at higher intake manifold pressures to reduce engine pumping work. Further, the engine's propensity to knock may be reduced since the EGR is cooled and any air that was warmed during the intake can be recirculated and re-cooled.

The present description may provide several advantages. For example, the approach may reduce engine pumping work, thereby reducing engine fuel consumption. In addition, the approach may reduce an engine's propensity to knock so that the possibility of engine degradation may be reduced. Further, the approach may provide EGR to engine cylinders during wide open throttle conditions to lower production of NOx within the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
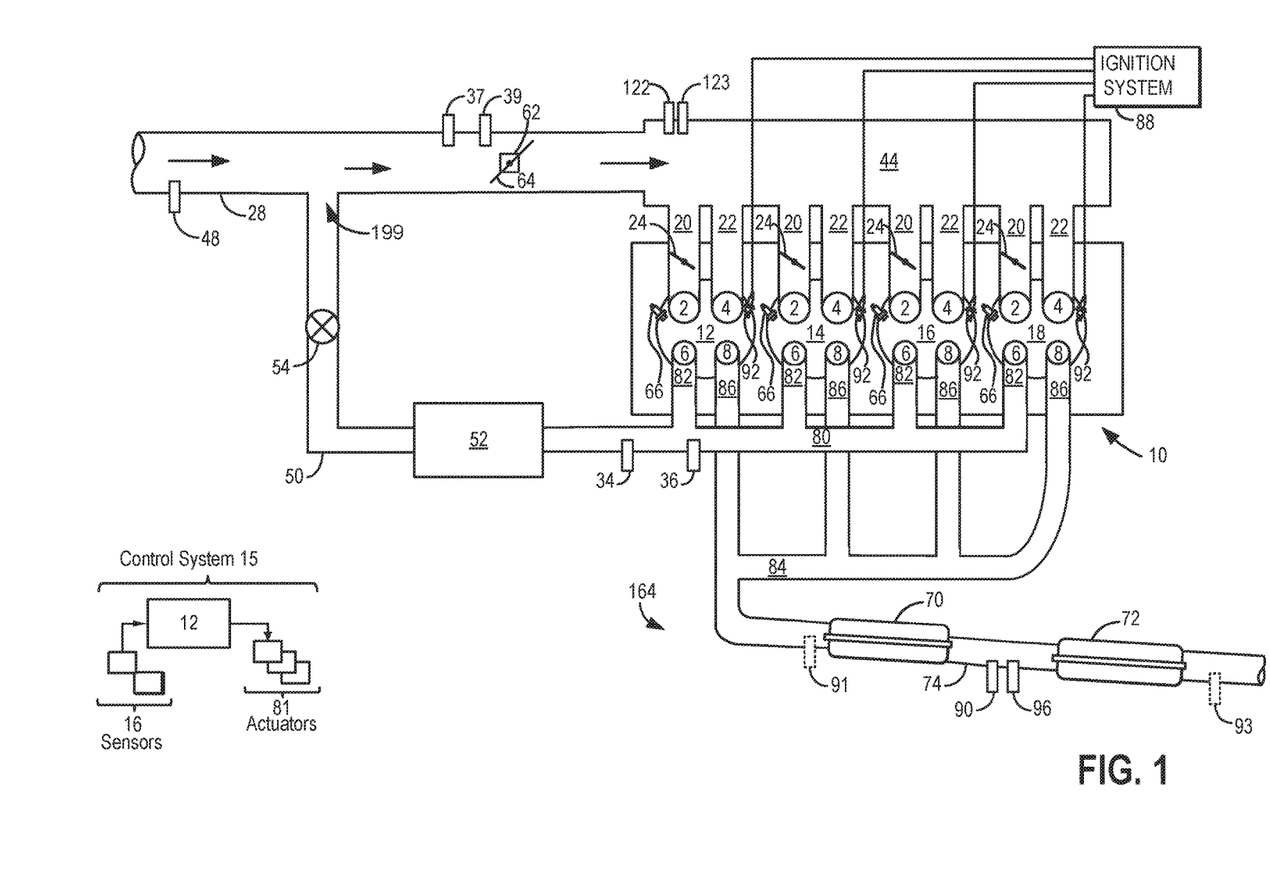
FIG. 1 shows a schematic depiction of a naturally aspirated engine system with a split exhaust system.
Figure 3A:
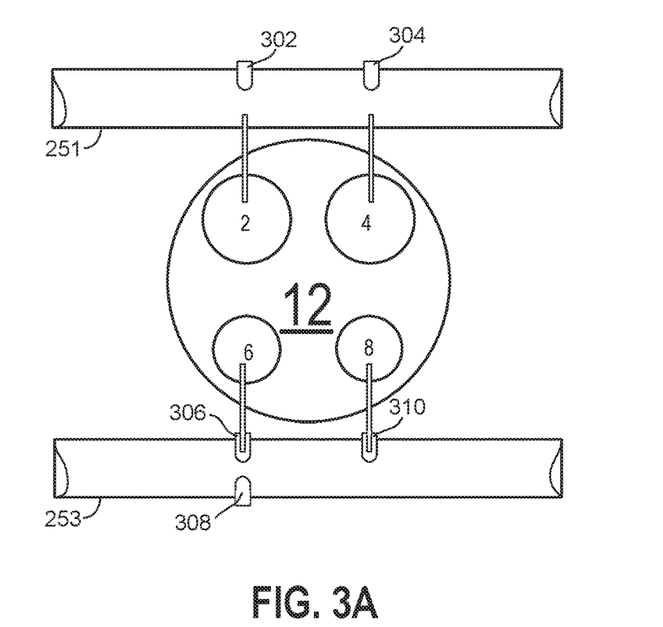
FIGS. 3A and 3B show example valve actuator mechanisms.
Figure 4:
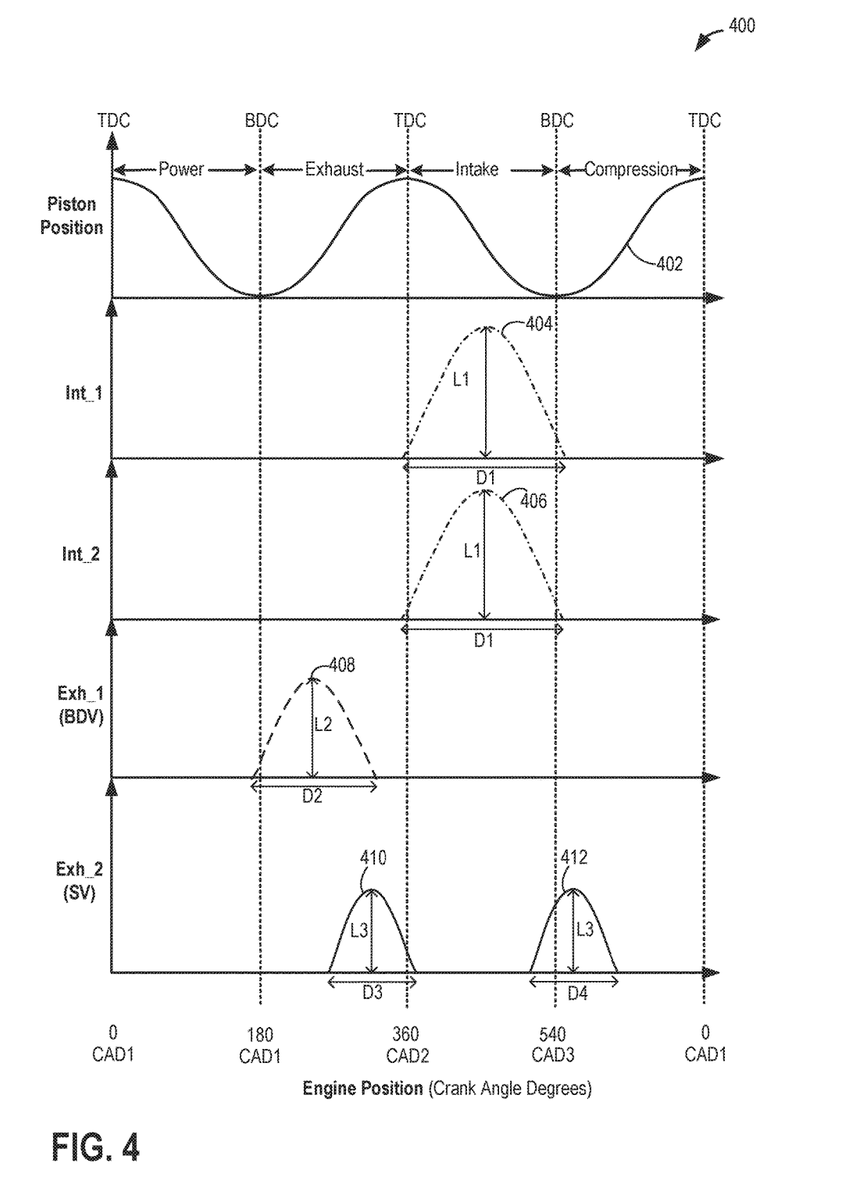
FIG. 4 shows example cylinder intake valve and exhaust valve timings for one of the engine cylinders of FIG. 1.
Figure 5:
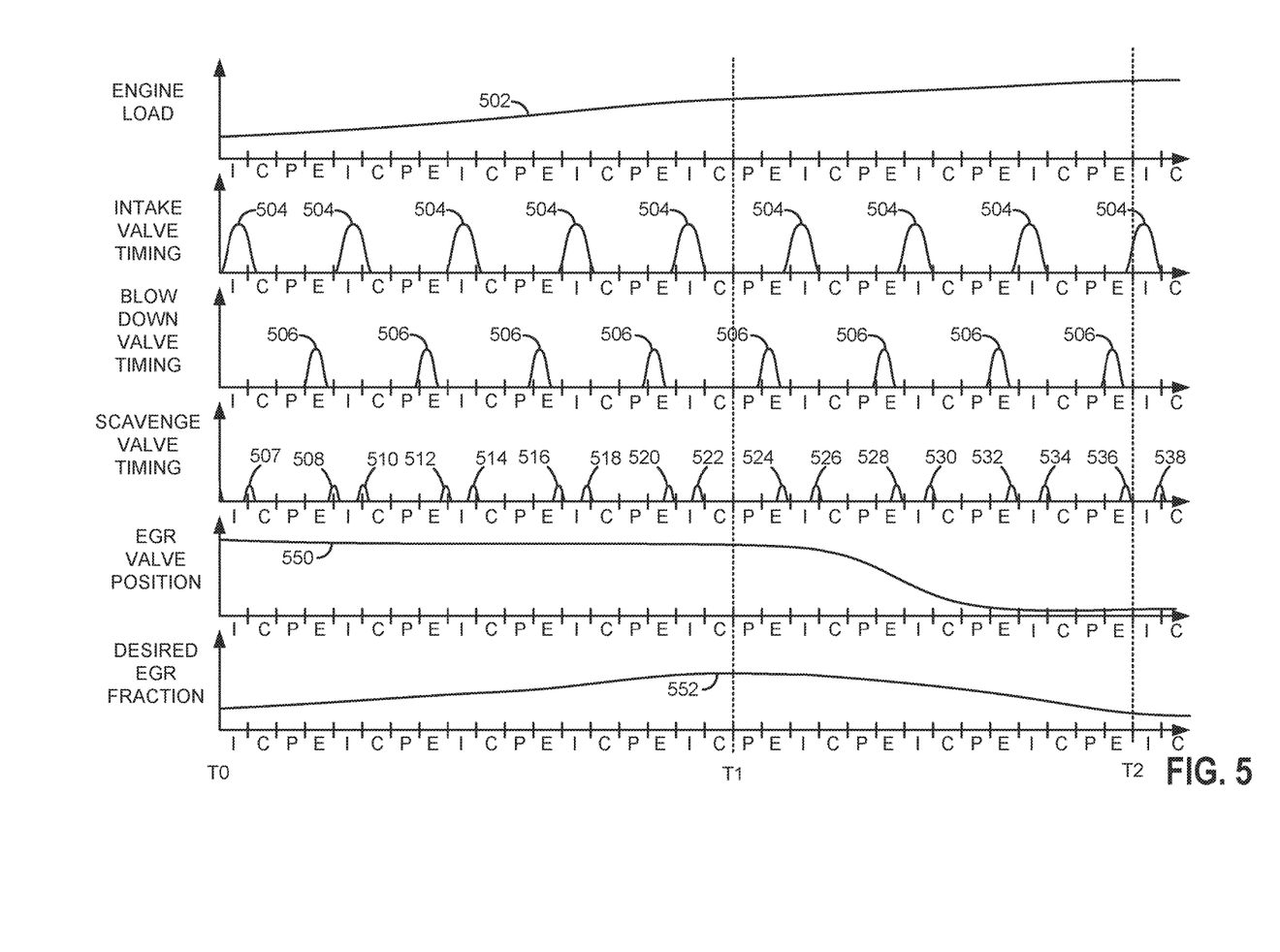
FIG. 5 shows an example engine operating sequence.

The following description relates to systems and methods for providing EGR to an engine. In one example, the engine may include a split exhaust system with an exhaust manifold and a scavenging manifold as shown in FIG. 1. The engine includes cylinders shown in more detail in FIG. 2. Engine cylinder poppet valves may be operated via actuators shown in FIGS. 3A and 3B. Intake and exhaust valves of the engine may be operated to open and close as shown in FIG. 4. An example engine operating sequence is shown in FIG. 5, which illustrates how exhaust valve timing and an EGR valve may be controlled to increase intake manifold pressure and push EGR to engine cylinders. A method for operating the engine is described in FIG. 6.

In the following description, a poppet valve being operational or activated indicates that it is opened and/or closed according to determined timings during an engine cycle for a given set of conditions. Likewise, a poppet valve being deactivated or inoperative indicates that the valve is maintained closed during an engine cycle, unless otherwise stated.

FIG. 1 shows a schematic diagram of a multi-cylinder internal combustion engine 10, which may be included in a propulsion system of an automobile. Engine 10 includes a plurality of combustion chambers (e.g., cylinders) which may be capped on the top by a cylinder head (not shown). In the example shown in FIG. 1, engine 10 includes cylinders 12, 14, 16, and 18, arranged in an inline-4 configuration. Further, engine 10 may be a four cycle engine. It should be understood, however, that though FIG. 1 shows four cylinders, engine 10 may include any number of cylinders in any configuration, e.g., V-6, I-6, V-12, opposed 4, etc. Further, the cylinders shown in FIG. 1 may have a cylinder configuration, such as the cylinder configuration shown in FIG. 2, as described further below. Each of cylinders 12, 14, 16, and 18 include two intake valves, including first intake valve 2 and second intake valve 4, and two exhaust valves, including first exhaust valve (referred to herein as a blowdown valve) 8 and second exhaust valve (referred to herein as a scavenge valve) 6. The intake valves and exhaust valves may be referred to herein as cylinder intake valves and cylinder exhaust valves, respectively. As explained further below with reference to FIG. 2, a timing (e.g., opening timing, closing timing, opening duration, etc.) of each of the intake valves may be controlled via various camshaft timing systems or via electrical mechanisms. In one example, both the first intake valves 2 and second intake valves 4 may be controlled to a same valve timing (e.g., such that they open and close at the same time in the engine cycle). In an alternate example, the first intake valves 2 and second intake valves 4 may be controlled at a different valve timing. Further, the first exhaust valves 8 may be controlled at a different valve timing than the second exhaust valves 6, as discussed further below. Second exhaust valve 6 opens and closes twice during each engine cycle (e.g., two revolutions for a four cycle engine).

Each cylinder receives intake air (or a mixture of intake air and recirculated exhaust gas, as explained further below) from an intake manifold 44 via an air intake passage 28. Intake manifold 44 is in fluidic communication with the cylinders via intake ports (e.g., runners). For example, intake manifold 44 is shown in FIG. 1 in fluidic communication with each first intake valve 2 of each cylinder via first intake ports 20. Further, the intake manifold 44 is in fluidic communication with each second intake valve 4 of each cylinder via second intake ports 22. In this way, each cylinder intake port can selectively communicate with the cylinder it is in fluidic communication with via a corresponding one of the first intake valves 2 or second intake valves 4. Each intake port may supply air and/or fuel to the cylinder it is in fluidic communication with.

One or more of the intake ports may include a charge motion control valve (CMCV). As shown in FIG. 1, each first intake port 20 of each cylinder includes a CMCV 24. CMCVs 24 may also be referred to as swirl control valves or tumble control valves. CMCVs 24 may restrict airflow entering the cylinders via first intake valves 2. In the example of FIG. 1, each CMCV 24 may include a valve plate; however, other designs of the valve are possible. Note that for the purposes of this disclosure the CMCV 24 is in the "closed" position when it is fully activated and the valve plate may be fully tilted into the respective first intake port 20, thereby resulting in maximum air charge flow obstruction. Alternatively, the CMCV 24 is in the "open" position when deactivated and the valve plate may be fully rotated to lie substantially parallel with airflow, thereby considerably minimizing or eliminating airflow charge obstruction. The CMCVs may principally be maintained in their "open" position and may only be activated "closed" when swirl conditions are desired. As shown in FIG. 1, only one intake port of each cylinder includes the CMCV 24. However, in alternate examples, both intake ports of each cylinder may include a CMCV 24. The controller 12 may actuate the CMCVs 24 (e.g., via a valve actuator that may be coupled to a rotating shaft directly coupled to each CMCV 24) to move the CMCVs into the open or closed positions, or a plurality of positions between the open and closed positions, in response to engine operating conditions (such as engine speed/load and/or when blowthrough via the second exhaust valves 6 is active), as explained further below. As referred to herein, blowthrough air or blowthrough combustion cooling may refer to intake air that flows from the one or more intake valves of each cylinder to second exhaust valves 6 (and into second exhaust manifold 80) during a valve opening overlap period between the intake valves and second exhaust valves 6 (e.g., a period when both the intake valves and second exhaust valves 6 are open at the same time), without combusting the blowthrough air.

A high pressure, dual stage, fuel system (such as the fuel system shown in FIG. 2) may be used to generate fuel pressures at injectors 66. As such, fuel may be directly injected in the cylinders via injectors 66. Distributorless ignition system 88 provides an ignition spark to cylinders 12, 14, 16, and 18 via sparks plug 92 in response to controller 12. Cylinders 12, 14, 16, and 18 are each in fluidic communication with two exhaust ports for channeling the blowdown and scavenging portions of the combustion gases separately. Specifically, as shown in FIG. 1, cylinders 12, 14, 16, and 18 exhaust or eject combustion gases (e.g., scavenging portion) to second exhaust manifold (referred to herein as a scavenge manifold) 80 via second exhaust runners (e.g., ports) 82 and combustion gases (e.g., blowdown portion) to first exhaust manifold (referred to herein as a blowdown manifold) 84 via first exhaust runners (e.g., ports) 86. Second exhaust runners 82 extend from cylinders 12, 14, 16, and 18 to second exhaust manifold 80. Second exhaust manifold is isolated from first exhaust manifold when EGR valve 54 is closed and when scavenging exhaust valves 6 are closed.

Each exhaust runner can selectively communicate with the cylinder it is in fluidic communication with via an exhaust valve. For example, second exhaust runners 82 communicate with their respective cylinders via second exhaust valves 6 and first exhaust runners 86 communicate with their respective cylinders via first exhaust valves 8. Second exhaust runners 82 are isolated from first exhaust runners 86 when at least one exhaust valve of each cylinder is in a closed position. Exhaust gases may not flow directly between exhaust runners 82 and 86. The exhaust system described above may be referred to herein as a split exhaust manifold system, where a first portion of exhaust gases from each cylinder are output to first exhaust manifold 84 and a second portion of exhaust gases from each cylinder are output to second exhaust manifold 80, and where the first and second exhaust manifolds do not directly communicate with one another (e.g., no passage directly couples the two exhaust manifolds to one another and thus the first and second portions of exhaust gases do not mix with one another within the first and second exhaust manifolds).

Exhaust gases exiting exhaust manifold 84 enter first emission control device 70 and a second emission control device 72, second emission control device 72 arranged downstream in exhaust passage 74 from first emission control device 70. Emission control devices 70 and 72 may include one or more catalyst bricks, in one example. In some examples, emission control devices 70 and 72 may be three-way type catalysts. In yet another example, second emission control device 72 may include a gasoline particulate filter (GPF). In one example, first emission control device 70 may include a catalyst and second emission control device 72 may include a GPF. After passing through emission control devices 70 and 72, exhaust gases may be directed out to a tailpipe and atmosphere.

Exhaust passage 74 further includes a plurality of exhaust sensors in electronic communication with controller 12 of control system 15, as described further below. As shown in FIG. 1, exhaust passage 74 includes a first oxygen sensor 90 positioned between first emission control device 70 and second emission control device 72. First oxygen sensor 90 may be configured to measure an oxygen content of exhaust gas entering second emission control device 72. Exhaust passage 74 may include one or more additional oxygen sensors positioned along exhaust passage 74, such as second oxygen sensor 91 positioned in exhaust manifold 84 upstream of first emission control device 70. In some examples, a third oxygen sensor 93 positioned downstream of second emission control device 72 may be provided. As such, second oxygen sensor 91 may be configured to measure the oxygen content of the exhaust gas entering first emission control device 70 and third oxygen sensor 93 may be configured to measure the oxygen content of exhaust gas exiting second emission control device 72. In one example, the one or more oxygen sensor 90, 91, and 93 may be Universal Exhaust Gas Oxygen (UEGO) sensors. Alternatively, a two-state exhaust gas oxygen sensor may be substituted for oxygen sensors 90, 91, and 93. Exhaust passage 74 may include various other sensors, such as one or more temperature and/or pressure sensors. For example, as shown in FIG. 1, a pressure sensor 96 is positioned within exhaust passage 74, between first emission control device 70 and second emission control device 72. As such, pressure sensor 96 may be configured to measure the pressure of exhaust gas entering second emission control device 72. Both pressure sensor 96 and oxygen sensor 90 are arranged within exhaust passage 74 at a point where a flow passage 98 couples to exhaust passage 74.

Second exhaust manifold 80 is directly coupled to exhaust gas recirculation (EGR) passage 50. EGR passage 50 is a coupled directly between second exhaust manifold 80 and intake passage 28 at exhaust gas recirculation inlet 199. As such, exhaust gases (or blowthrough air, as explained further below) is directed from second exhaust manifold 80 to intake passage 28, upstream of throttle 62, via EGR passage 50. As shown in FIG. 1, EGR passage 50 includes an EGR cooler 52 configured to cool exhaust gases flowing from second exhaust manifold 80 to intake passage 28 and an EGR valve 54. Controller 12 is configured to actuate and adjust a position of EGR valve 54 in order to control an amount of air flow and exhaust flow through EGR passage 50. When EGR valve 54 is in a closed position, no exhaust gases or intake air may flow from second exhaust manifold 80 to intake passage 28, upstream of throttle 62. Further, when EGR valve 54 is in an open position, exhaust gases and/or blowthrough air may flow from second exhaust manifold 80 to intake passage 28, upstream of throttle 62. Controller 12 may additionally adjust EGR valve 54 into a plurality of positions between fully open and fully closed.

Alternatively, an EGR passage may be coupled between second exhaust manifold 80 and intake passage 28 at a location downstream of throttle 62.

Intake passage 28 includes an electronic intake throttle 62 in communication with intake manifold 44. The position of a throttle plate 64 of throttle 62 can be adjusted by control system 15 via a throttle actuator (not shown) communicatively coupled to controller 12. By modulating air intake throttle 62, an amount of fresh air may be inducted from the atmosphere and/or an amount of recirculated exhaust gas from the one or more EGR passages into engine 10 and delivered to the engine cylinders via intake manifold 44.

Second exhaust manifold 80 and/or second exhaust runners 82 may include one or more sensors (such as pressure, oxygen, and/or temperature sensors) disposed therein. For example, as shown in FIG. 1, second exhaust manifold 80 includes a pressure sensor 34 and oxygen sensor 36 disposed therein and configured to measure a pressure and oxygen content, respectively, of exhaust gases and blowthrough (e.g., intake) air, exiting second exhaust valves 6 and entering second exhaust manifold 80.

Intake passage 28 may include one or more additional sensors (such as additional pressure, temperature, flow rate, and/or oxygen sensors). For example, as shown in FIG. 1, intake passage 28 includes a mass air flow (MAF) sensor 48 disposed upstream of throttle 62 and where EGR passage 50 couples to intake passage 28. An intake pressure sensor 37 may be positioned in intake passage 28 upstream of throttle 28. In some examples, as shown in FIG. 1, an intake oxygen sensor 39 may be positioned in intake passage 28 upstream of throttle 28. Further, an intake manifold pressure (e.g., MAP) sensor 122 and intake manifold temperature sensor 123 are positioned within intake manifold 44, upstream of all engine cylinders.

Figure 2:
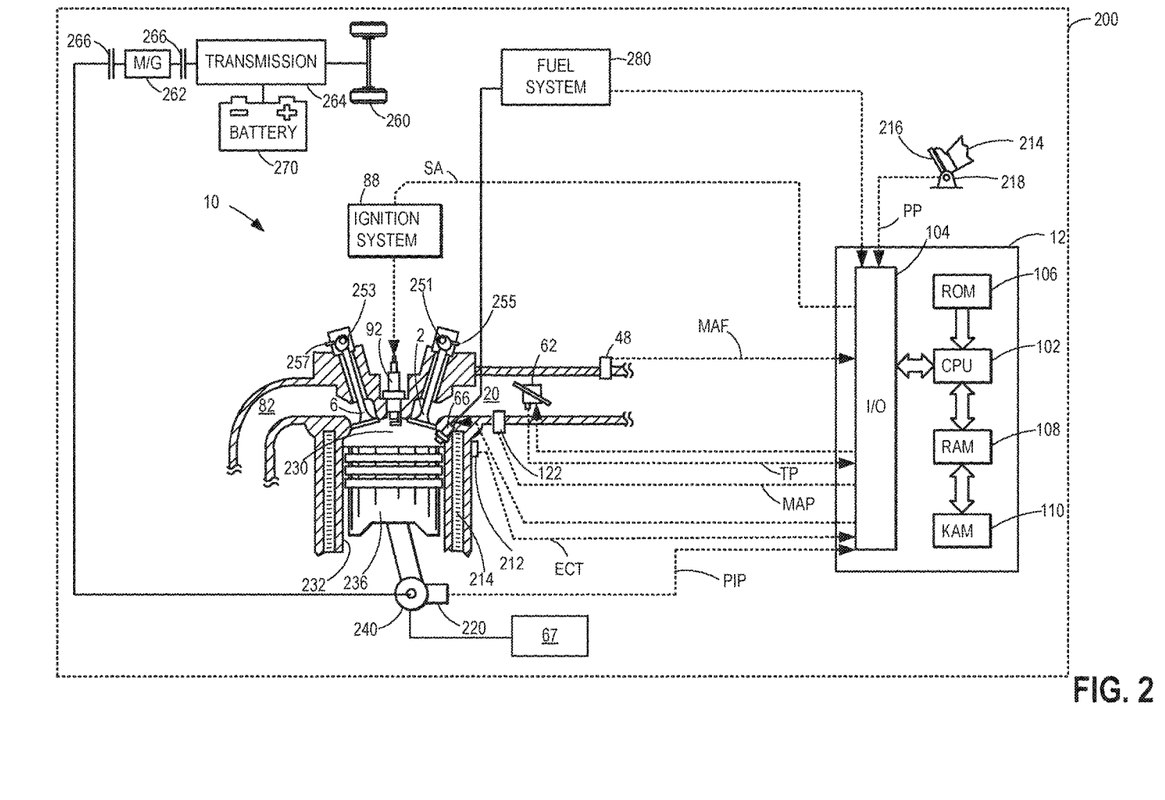
FIG. 2 shows a detailed cross section of an engine cylinder of the engine system.

In some examples, engine 10 may be coupled to an electric motor/battery system (as shown in FIG. 2) in a hybrid vehicle. The hybrid vehicle may have a parallel configuration, series configuration, or variation or combinations thereof. Further, in some examples, other engine configurations may be employed, for example a diesel engine.

Engine 10 may be controlled at least partially by a control system 15 including controller 12 and by input from a vehicle operator via an input device (not shown in FIG. 1). Control system 15 is shown receiving information from a plurality of sensors 16 (various examples of which are described herein) and sending control signals to a plurality of actuators 81. As one example, sensors 16 may include pressure, temperature, and oxygen sensors located within the intake passage 28, intake manifold 44, exhaust manifold 84, and second exhaust manifold 80, as described above. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 2. As another example, actuators 81 may include fuel injectors, actuators for valves 63, 42, 54, 59, 32, 97, 76, and throttle 62. Actuators 81 may further include various camshaft timing actuators coupled to the cylinder intake and exhaust valves. Controller 12 may receive input data from the various sensors, process the input data, and trigger the actuators in response to the processed input data based on instruction or code programmed in a memory of controller 12 corresponding to one or more routines. Example control routines are described herein at FIG. 5. For example, adjusting EGR flow from second exhaust manifold 80 to intake passage 28 may include adjusting an actuator of EGR valve 54 to adjust an amount of exhaust flow flowing to intake passage 28 from second exhaust manifold 80. In another example, adjusting EGR flow from second exhaust manifold 80 to intake passage 28 may include adjusting an actuator of an exhaust valve camshaft to adjust an opening timing of second exhaust valves 6.

In this way, the first and second exhaust manifolds of FIG. 1 may be designed to separately channel the blowdown (e.g., a first portion) and scavenging (e.g., second portion) portions of the exhaust. First exhaust manifold 84 may direct the blowdown pulse of the exhaust to emissions device 70 while second exhaust manifold 80 may direct the scavenging portion of exhaust to intake passage 28 via EGR passage 50.

Referring now to FIG. 2, it depicts a partial view of a single cylinder of internal combustion engine 10 which may be installed in a vehicle 200. As such, components previously introduced in FIG. 1 are represented with the same reference numbers and are not re-introduced. Engine 10 is depicted with combustion chamber (cylinder) 230, coolant sleeve 214, and cylinder walls 232 with piston 236 positioned therein and connected to crankshaft 240. Combustion chamber 230 is shown communicating with intake passage 20 and exhaust passage 82 via respective intake valve 2 and exhaust valve 6. Intake valve 4 and exhaust valve 8 (not shown) are configured similarly to intake valve 2 and exhaust valve 6. As previously described in FIG. 1, each cylinder of engine 10 may exhaust combustion products along two conduits. In the depicted view, exhaust passage 82 represents the second exhaust runner (e.g., port) leading from the cylinder to the turbine (such as second exhaust runner 82 of FIG. 1) while the first exhaust runner is not visible in this view.

As also previously elaborated in FIG. 1, each cylinder of engine 10 may include two intake valves and two exhaust valves. In the depicted view, intake valve 2 and exhaust valve 6 are located at an upper region of combustion chamber 230. Intake valve 2 and exhaust valve 6 may be controlled by controller 12 using respective cam actuation systems including one or more cams or electrical actuators shown in greater detail in FIGS. 3A and 3B. The cam actuation systems may utilize one or more of cam profile switching (CPS), variable cam timing (VCT), variable valve timing (VVT) and/or variable valve lift (VVL) systems to vary valve operation. In the depicted example, each intake valve 2 is controlled by an intake cam 251 and each exhaust valve 6 is controlled by an exhaust cam 253. The position of intake valve 2 and exhaust valve 6 may be determined by valve position sensors 255 and 257, respectively. As introduced above, in one example, all exhaust valves of every cylinder may be controlled on a same exhaust camshaft. As such, both a timing of the scavenge (second) exhaust valves and the blowdown (first) exhaust valves may be adjusted together via one camshaft, but they may each have different timings relative to one another. In another example, the scavenge exhaust valve of every cylinder may be controlled on a first exhaust camshaft and a blowdown exhaust valve of every cylinder may be controlled on a different, second exhaust camshaft. In this way, the valve timing of the scavenge valves and blowdown valves may be adjusted separately from one another. In alternate examples, the cam or valve timing system(s) of the scavenge and/or blowdown exhaust valves may employ a cam in cam system, a multi-air type system on the scavenge valves, and/or an electric valve lift control on the scavenge valves.

Figure 3B:
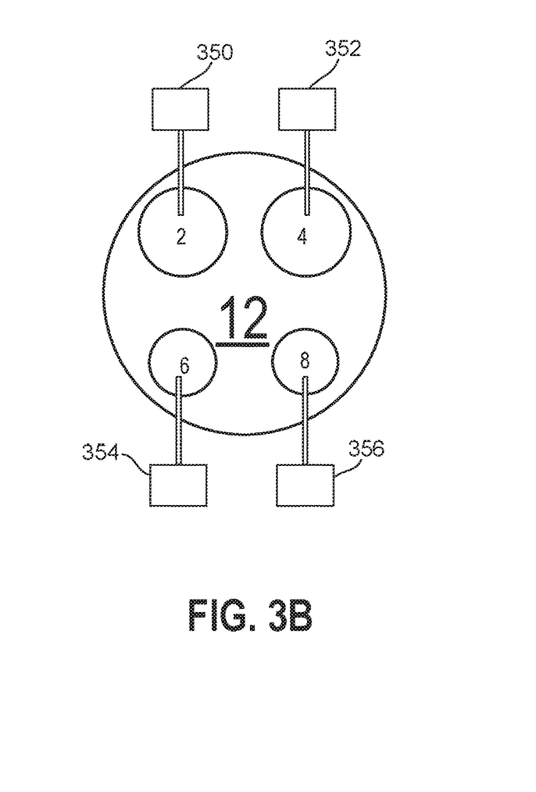

For example, in some examples, the intake and/or exhaust valve may be controlled by electric valve actuation as shown in FIG. 3B. For example, cylinder 230 may alternatively include an intake valve controlled via electric valve actuation and an exhaust valve controlled via cam actuation including CPS and/or VCT systems. In still other examples, the intake and exhaust valves may be controlled by a common valve actuator or actuation system, or a variable valve timing actuator or actuation system.

In one example, intake cam 251 includes separate and different cam lobes that provide different valve profiles (e.g., valve timing, valve lift, duration, etc.) for each of the two intake valves of combustion chamber 230. Likewise, exhaust cam 253 may include separate and different cam lobes that provide different valve profiles (e.g., valve timing, valve lift, duration, etc.) for each of the two exhaust valves of combustion chamber 230. In another example, intake cam 251 may include a common lobe, or similar lobes, that provide a substantially similar valve profile for each of the two intake valves.

In addition, different cam profiles for the different exhaust valves can be used to separate exhaust gases exhausted at low cylinder pressure from exhaust gases exhausted at exhaust pressure. For example, a first exhaust cam profile can open from closed position the first exhaust valve (e.g., blowdown valve) just before BDC (bottom dead center) of the power stroke of combustion chamber 230 and close the same exhaust valve well before top dead center (TDC) to selectively exhaust blowdown gases from the combustion chamber. Further, a second exhaust cam profile can be positioned to open from close a second exhaust valve (e.g., scavenge valve) before a mid-point of the exhaust stroke and close it shortly after TDC to selectively exhaust the scavenging portion of the exhaust gases.

Thus, the timing of the first exhaust valve and the second exhaust valve can isolate cylinder blowdown gases from scavenging portion of exhaust gases while any residual exhaust gases in the clearance volume of the cylinder can be cleaned out with fresh intake air blowthrough during positive valve overlap between the intake valve and the scavenge exhaust valves. By flowing a first portion of the exhaust gas (e.g., higher pressure exhaust) through the emissions device and flowing a second portion of the exhaust gas (e.g., lower pressure exhaust) and blowthrough air is circulated to the engine air inlet, combustion temperatures can be reduced and intake manifold pressure may be raised reduce engine pumping work and NOx.

Cylinder 230 can have a compression ratio, which is the ratio of volumes when piston 236 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 92 for initiating combustion. Ignition system 88 can provide an ignition spark to combustion chamber 230 via spark plug 92 in response to spark advance signal SA from controller 12, under select operating modes. However, in some examples, spark plug 92 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 230 is shown including one fuel injector 66. Fuel injector 66 is shown coupled directly to combustion chamber 230 for injecting fuel directly therein in proportion to the pulse width of a signal received from controller 12. In this manner, fuel injector 66 provides what is known as direct injection (hereafter also referred to as "DI") of fuel into combustion cylinder 230. While FIG. 2 shows injector 66 as a side injector, it may also be located overhead of the piston, such as near the position of spark plug 92. Such a position may improve mixing and combustion when operating the engine with an alcohol-based fuel due to the lower volatility of some alcohol-based fuels. Alternatively, the injector may be located overhead and near the intake valve to improve mixing. In an alternate example, injector 66 may be a port injector providing fuel into the intake port upstream of cylinder 230.

Fuel may be delivered to fuel injector 66 from a high pressure fuel system 280 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 280 may hold fuel with different fuel qualities, such as different fuel compositions. These differences may include different alcohol content, different octane, different heat of vaporizations, different fuel blends, and/or combinations thereof etc. In some examples, fuel system 280 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Controller 12 is shown in FIG. 2 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from temperature sensor 212 coupled to coolant sleeve 214; a profile ignition pickup signal (PIP) from Hall effect sensor 220 (or other type) coupled to crankshaft 240; throttle position (TP) from a throttle position sensor; absolute manifold pressure signal (MAP) from sensor 122, and abnormal combustion from a knock sensor (not shown) and a crankshaft acceleration sensor (not shown). Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 66, throttle 62, spark plug 92, intake/exhaust valves and cams, etc. The controller may receive input data from the various sensors, process the input data, and trigger the actuators in response to the processed input data based on instruction or code programmed therein corresponding to one or more routines.

In some examples, vehicle 200 may be a hybrid vehicle with multiple sources of torque available to one or more vehicle wheels 260. In other examples, vehicle 200 is a conventional vehicle with only an engine, or an electric vehicle with only electric machine(s). In the example shown in FIG. 2, vehicle 200 includes engine 10 and an electric machine 262. Electric machine 262 may be a motor or a motor/generator. Crankshaft 240 of engine 10 and electric machine 262 are connected via a transmission 264 to vehicle wheels 260 when one or more clutches 266 are engaged. In the depicted example, a first clutch 266 is provided between crankshaft 240 and electric machine 262, and a second clutch 266 is provided between electric machine 262 and transmission 264. Controller 12 may send a signal to an actuator of each clutch 266 to engage or disengage the clutch, so as to connect or disconnect crankshaft 240 from electric machine 262 and the components connected thereto, and/or connect or disconnect electric machine 262 from transmission 264 and the components connected thereto. Transmission 264 may be a gearbox, a planetary gear system, or another type of transmission. The powertrain may be configured in various manners including as a parallel, a series, or a series-parallel hybrid vehicle.

Electric machine 262 receives electrical power from a traction battery 270 to provide torque to vehicle wheels 260. Electric machine 262 may also be operated as a generator to provide electrical power to charge battery 270, for example during a braking operation.

Referring now to FIG. 3A, a first cylinder poppet valve actuator system is shown. In this non-limiting example, exhaust valves may be opened and closed via exhaust camshaft 253. Exhaust camshaft 253 includes two cam lobes to open and close exhaust valve 6 twice for every two engine revolutions. Exhaust camshaft 253 includes a first cam lobe 306 that operates exhaust poppet valve 6 and a second cam lobe 308 that also operates exhaust poppet valve 6. The angular distance between first cam lobe 306 and second cam lobe 308 is fixed, but the positions of cam lobes 306 and 308 may be adjusted relative to crankshaft position. Exhaust poppet valve 8 is operated via a sole cam lobe 310, and exhaust poppet valve 8 opens and closes once every two engine revolutions.

Intake valves are operated via intake camshaft 251. Intake poppet valve 2 is operated via sole cam lobe 302 and intake poppet valve 4 is operated via sole cam lobe 304. Cam lobes 302 and 304 open and close intake poppet valves 2 and 4 once for each two engine revolutions. The positions of cam lobes 302 and 304 may be adjusted relative to crankshaft position.

Thus, intake and exhaust valves may be operated via intake and exhaust camshafts. The intake and exhaust camshafts may include one cam lobe for each blowdown exhaust valve and two cam lobes for each scavenge exhaust valve. The two cam lobes for each scavenge exhaust valve allows the piston to provide pressurized exhaust and air to the second or scavenge exhaust manifold.

Referring now to FIG. 3B, a second cylinder poppet valve actuator system is shown. In this example, intake poppet valves 2 and 4 are opened and closed via electrical valve actuators 350 and 352. Operation of electrical valve actuators may or may not be based on engine crankshaft position. If electrical valve actuator operation is not based on engine crankshaft position, electric actuators 350 and 352 may open and close intake valves 2 and 4 at a same time or different times.

Exhaust valves 6 and 8 are opened and closed via electric valve actuators 354 and 356. Electric valve actuators 354 and 356 may operate synchronously or asynchronously with the engine's crankshaft. Further, electric valve actuator 354 may open and close exhaust valve 6 twice for each two engine revolutions while electric valve actuator 356 opens and closes exhaust valve 8 once for each two engine revolutions.

Thus, intake and exhaust valves may be operated via electric valve actuators. The electric valve actuators may be operated together or independently. Electric valve actuators 350-356 may directly or indirectly open the intake and exhaust valves.

Thus, the system of FIGS. 1-3B provides for a system, comprising: a naturally aspirated engine including an intake, a plurality of blowdown exhaust valves, and a plurality of scavenging exhaust valves; an exhaust manifold coupled to the engine and in fluidic communication with the plurality of blowdown exhaust valves; a scavenging manifold coupled to the engine, the scavenging manifold in communication with the plurality of scavenging exhaust valves; an exhaust gas cooler coupled to the scavenging manifold; an exhaust gas recirculation valve positioned in a passage between the exhaust gas cooler and the intake; and a camshaft including one lobe for each of the plurality of blowdown valves and two lobes for each of the scavenging exhaust valves. In a first example, the system further comprises a controller including executable instructions stored in non-transitory memory for closing the exhaust gas recirculation valve at engine loads greater than a threshold. In a second example, the system may also further comprise additional instructions to advance the camshaft in response to an increase in engine load. In a third example, the system includes additional instructions to flow exhaust gas to engine cylinders at wide open throttle conditions. The system further comprises an adjustable intake camshaft. The system further comprises a throttle and an exhaust gas recirculation inlet, the throttle positioned upstream of the exhaust gas recirculation inlet.

Now turning to FIG. 4, sequence 400 depicts example valve timings with respect to a piston position, for an engine cylinder comprising 4 valves: two intake valves and two exhaust valves, such as described in FIGS. 1-3B. The sequence of FIG. 4 may be provided via the system of FIGS. 1-3B according to the method of FIG. 6. The sequence of FIG. 4 shows one cylinder cycle of a four stroke engine. The cylinder cycle begins at top-dead-center compression stroke (e.g., 0 CAD) and ends at top-dead-center compression stroke 720 CAD later. The example of FIG. 4 is drawn substantially to scale, even though each and every point is not labeled with numerical values. As such, relative differences in timings can be estimated by the drawing dimensions. However, other relative timings may be used, if desired.

Sequence 400 illustrates an engine position along the horizontal-axis in crank angle degrees (CAD). Curve 402 depicts piston positions (along the vertical-axis), with reference to their location from top dead center (TDC) and/or bottom dead center (BDC), and further with reference to their location within the four strokes (intake, compression, power and exhaust) of an engine cycle. Valve lift for each of the described valves increases in the direction of the respective allows of the vertical axis.

During engine operation, each cylinder typically undergoes a four stroke cycle including an intake stroke, compression stroke, expansion stroke, and exhaust stroke. During the intake stroke, generally, the exhaust valves close and intake valves open. Air is introduced into the cylinder via the corresponding intake passage, and the cylinder piston moves to the bottom of the cylinder so as to increase the volume within the cylinder. The position at which the piston is near the bottom of the cylinder and at the end of its stroke (e.g. when the combustion chamber is at its largest volume) is typically referred to by those of skill in the art as bottom dead center (BDC). During the compression stroke, the intake valves and exhaust valves are closed. The piston moves toward the cylinder head so as to compress the air within combustion chamber. The point at which the piston is at the end of its stroke and closest to the cylinder head (e.g. when the combustion chamber is at its smallest volume) is typically referred to by those of skill in the art as top dead center (TDC). In a process herein referred to as injection, fuel is introduced into the combustion chamber. In a process herein referred to as ignition, the injected fuel is ignited by known ignition means, such as a spark plug, resulting in combustion. During the expansion stroke, the expanding gases push the piston back to BDC. A crankshaft converts this piston movement into a rotational torque of the rotary shaft. During the exhaust stroke, in a traditional design, exhaust valves are opened to release the residual combusted air-fuel mixture to the corresponding exhaust passages and the piston returns to TDC. In this description, the second exhaust (scavenge) valves may be opened after the beginning of the exhaust stroke and stay open until after the end of the exhaust stroke while the first exhaust (blowdown) valves are closed and the intake valves are opened to flush out residual exhaust gases with blowthrough air. Further, the second exhaust valve (e.g., 6 of FIG. 1) may open and close a second time during the intake and compression strokes to push air into the second exhaust manifold 80. All gases in the second exhaust manifold are directed to the intake manifold where they may be reintroduced to the cylinders and raise intake manifold pressure to lower engine pumping work.

Curve 404 depicts a first intake valve timing, lift, and duration for a first intake valve (Int_1) while curve 406 depicts a second intake valve timing, lift, and duration for a second intake valve (Int_2) coupled to the intake passage of the engine cylinder. Curve 408 depicts an example exhaust valve timing, lift, and duration for a first exhaust valve (Exh_1, which may correspond to first, or blowdown, exhaust valves 8 shown in FIG. 1) that is in fluidic communication with the first exhaust manifold (e.g., blowdown exhaust manifold 84 shown in FIG. 1) of the engine cylinder, while curve 410 depicts an example first exhaust valve timing, lift, and duration for a second exhaust valve (Exh_2, which may correspond to second, or scavenge, exhaust valves 6 shown in FIG. 1) that is in fluidic communication with the second exhaust manifold (e.g., scavenge manifold 80 shown in FIG. 1) of the engine cylinder. Curve 412 depicts a second exhaust valve timing, lift, and duration for the second exhaust valve in the cycle of the cylinder. As previously elaborated, the first exhaust manifold directs gases output via the first exhaust valve to the emissions device 70 and the second exhaust manifold directs gases output via the second exhaust valve to an intake passage via EGR passage 50. The first and second exhaust manifolds may be separate from each other, as explained above.

In the depicted example, the first and second intake valves are fully opened from a closed position at a common timing (curves 404 and 406), starting close to intake stroke TDC, just before CAD2 (e.g., at or just after intake stroke TDC) and are closed after a subsequent compression stroke has commenced past CAD3 (e.g., after BDC). Additionally, when opened fully, the two intake valves may be opened with the same amount of valve lift L1 for the same duration of D1. In other examples, the two valves may be operated with a different timing by adjusting the phasing, lift or duration based on engine conditions. The intake valves are closed when traces 404 and 406 are not visible. The vertical axis for Int_1 and Int_2 represents intake valve lift and intake valve lift increases in the direction of the vertical axis arrow. Intake valve lift is zero at the horizontal axis.

Now turning to the exhaust valves wherein the timing of the first exhaust valve and the second exhaust valve is staggered relative to one another. Further, the second exhaust valve Exh_2 opens and closes twice during an engine cycle. Specifically, the first exhaust valve is opened from a closed position at a first timing (curve 408) that is earlier (e.g., advanced) in the engine cycle than the timing (curve 410) at which the second exhaust valve is opened from close. Specifically, the first timing for opening the first exhaust valve is between TDC and BDC of the power stroke, before CAD1 (e.g., before exhaust stroke BDC) while the timing for opening the second exhaust valve is after exhaust stroke BDC, after CAD1 but before CAD2. The first (curve 408) exhaust valve is closed before the end of the exhaust stroke and the second (curve 410) exhaust valve is closed after the end of the exhaust stroke. Thus, the second exhaust valve remains open to overlap slightly with opening of the intake valves. Further, the second exhaust valve opens a second time during a same engine cycle after top-dead-center (TDC) intake stroke and before bottom-dead-center (BDC) intake stroke. The second exhaust valve closes a second time during the same engine cycle at a time after BDC intake stroke and before TDC compression stroke of the cylinder.

To elaborate, the first exhaust valve may begin to open from close before the start of an exhaust stroke (e.g., between 90 and 40 degrees before BDC), maintained at least partially open through a first part of the exhaust stroke and may be fully closed before the exhaust stroke ends (e.g., between 50 and 0 degrees before TDC exhaust stroke) to collect the blowdown portion of the exhaust pulse. The second exhaust valve (curve 410) may begin opening from a closed position just after the beginning of the exhaust stroke (e.g., between 40 and 90 degrees past BDC of the exhaust stroke), maintained open through a second portion of the exhaust stroke, and may be fully closed after the intake stroke begins (e.g., between 20 and 70 degrees after TDC intake stroke) to exhaust the scavenging portion of the exhaust. The first opening 410 of the second exhaust valve during the cycle of the cylinder may be referred to as opening of the second exhaust valve for increasing EGR. The second exhaust valve may be opened a second time (curve 412) from about 60 degrees before BDC intake stroke to about 90 degrees after BDC compression stroke. The second opening 412 of the second exhaust valve during the cycle of the cylinder may be referred to as opening of the second exhaust valve for increasing intake manifold pressure. Additionally, the second exhaust valve and the intake valves, as shown in FIG. 4, may have a positive overlap phase (e.g., from between 20 degrees before TDC and 40 degrees after TDC until between 40 and 90 degrees past TDC) to allow blowthrough with EGR. This cycle, wherein all four valves are operational, may repeat itself based on engine operating conditions.

Additionally, the first exhaust valve may be opened at a first timing with a first amount of valve lift L2 while the second exhaust valve may be opened with a second amount of valve lift L3 (curve 310), where L3 is smaller than L2. Further still, the first exhaust valve may be opened at the first timing for a duration D2 while the second exhaust valve may be opened for a duration D3 and a duration D4, where D3 is smaller than D2. Duration D4 may be shorter, longer, or equal to duration D3. It will be appreciated that in alternate examples, the two exhaust valves may have the same amount of valve lift and/or same duration of opening while opening at differently phased timings.

In this way, by using staggered valve timings, engine efficiency and power can be increased by separating exhaust gases released at higher pressure (e.g., expanding blowdown exhaust gases in a cylinder) from residual exhaust gases at low pressure (e.g., exhaust gases that remain in the cylinder after blow-down) into the different passages. By conveying low pressure residual exhaust gases as EGR along with blowthrough air to the intake manifold, combustion chamber temperatures can be lowered and intake manifold pressure raised, so that the possibility of engine knock may be reduced and engine pumping work may be reduced.

In this way, exhaust gases may be pumped from engine cylinders at a positive pressure above atmospheric pressure so that EGR may be provided to engine cylinders when the engine is operating at high loads (e.g., near wide open throttle conditions). In addition, intake manifold pressure may be raised to decrease engine pumping work since a portion of air inducted to the cylinder may be returned to the engine air intake while the engine operates with a stoichiometric air-fuel ratio.

Referring now to FIG. 5, an example intake and exhaust valve operating sequence for a cylinder of an engine is show. The sequence of FIG. 5 may be provided by the system of FIGS. 1-3B according to the method of FIG. 6.

The first plot from the top of FIG. 5 is a plot of engine load 502 versus engine crankshaft position. The vertical axis represents engine load and engine load increases in a direction of the vertical axis arrow. Engine load may be expressed as present engine air flow divided by a maximum theoretical engine air flow. Accordingly, engine load may be expressed as a value between 0 and 1. The horizontal axis represents engine position and each cylinder stroke of the cylinder described is separated by a small vertical bar. The cylinder strokes are identified by I (intake stroke), C (compression stroke), P (power stroke), and E (exhaust stroke).

The second plot from the top of FIG. 5 is a plot of a cylinder's intake valve timing versus engine crankshaft position. The vertical axis represents intake valve timing and engine intake valves are open when trace 504 is at a level higher than the horizontal axis. In this example, both intake valves follow trace 504. Thus, both intake valves open and close at a same time. The horizontal axis represents engine position and each cylinder stroke of the cylinder described is separated by a small vertical bar. The cylinder strokes are identified by I (intake stroke), C (compression stroke), P (power stroke), and E (exhaust stroke).

The third plot from the top of FIG. 5 is a plot of the cylinder's blowdown exhaust valve (e.g., valve 8 of FIG. 1) timing versus engine crankshaft position. The vertical axis represents blowdown exhaust valve timing and the blowdown exhaust valve is open when trace 506 is at a level higher than the horizontal axis. The horizontal axis represents engine position and each cylinder stroke of the cylinder described is separated by a small vertical bar. The cylinder strokes are identified by I (intake stroke), C (compression stroke), P (power stroke), and E (exhaust stroke).

The fourth plot from the top of FIG. 5 is a plot of the cylinder's scavenge exhaust valve (e.g., valve 6 of FIG. 1) timing versus engine crankshaft position. The vertical axis represents scavenge exhaust valve timing and the scavenge exhaust valve is open when traces 507-538 are at a level higher than the horizontal axis. Scavenge exhaust valve openings at 508, 512, 516, 520, 524, 528, 532, and 536 are scavenging exhaust valve timings for increasing EGR flow to the engine. Scavenge exhaust valve openings at 507, 510, 514, 518, 522, 526, 530, 534, and 538 are scavenging exhaust valve timings for increasing engine intake manifold pressure. The horizontal axis represents engine position and each cylinder stroke of the cylinder described is separated by a small vertical bar. The cylinder strokes are identified by I (intake stroke), C (compression stroke), P (power stroke), and E (exhaust stroke). Each scavenge exhaust valve opening and closing is identified by a unique number so that the sequence may be described in detail below.

The fifth plot from the top of FIG. 5 is a plot of EGR valve position versus engine crankshaft position. The vertical axis represents EGR valve position and the EGR valve is more open when trace 550 is at a higher level near the vertical axis arrow. The EGR valve is closed at the level of the horizontal axis. The horizontal axis represents engine position and each cylinder stroke of the cylinder described is separated by a small vertical bar. The cylinder strokes are identified by I (intake stroke), C (compression stroke), P (power stroke), and E (exhaust stroke).

The sixth plot from the top of FIG. 5 is a plot of desired EGR fraction versus engine crankshaft position. The vertical axis represents desired EGR fraction and the EGR fraction increases in the direction of the vertical axis arrow. The horizontal axis represents engine position and each cylinder stroke of the cylinder described is separated by a small vertical bar. The cylinder strokes are identified by I (intake stroke), C (compression stroke), P (power stroke), and E (exhaust stroke).

At time T0, engine load is at a lower level and the EGR valve is open. The intake valves open during the first intake stroke to the right of time T0 and they close early in the first compression stroke to the right of T0. The first exhaust valve or the blowdown valve is closed in the intake stroke just after time T0. The second exhaust valve or the scavenge valve is closed just after time T0 and it is reopened as shown by trace 507 late in the first intake stroke after time T0. The scavenge valve is closed neat TDC intake stroke of the cylinder. The desired EGR fraction (e.g., the fraction of EGR in the cylinder) is at a lower level indicating a small amount of EGR is requested in engine cylinders at low engine load.

Between time T0 and time T1, engine load increases from a lower level to a higher level in response to an increase in driver demand torque (not shown). Intake valve timing is advanced as engine load increases. By advancing intake valve timing, the engine cylinder may induct more air and EGR into the cylinder. Timing of the blowdown exhaust valve is advanced as engine speed increases (not shown) with increasing engine load. Advancing the blowdown exhaust valve opening time with increasing load and speed allows time for exhaust gases to exit the cylinder at higher engine speeds. The second exhaust valve opening time is also advanced to increase EGR flow to the cylinders and decrease blowthrough air to the engine cylinders.

At low load and low engine speed, the first opening of the second exhaust valve is late in the exhaust stroke and it closes in the intake stroke so that only a small amount of EGR is introduced to engine cylinders. At low engine loads and speeds, the engine may be able to tolerate only a small amount of EGR. Therefore, the EGR amount is limited by opening the second exhaust valve late in the exhaust stroke. The second opening of the second exhaust valve is late during the intake stroke and closing of the second opening of the second exhaust valve is in the compression stroke. This timing allows increased intake manifold pressure by closing the second opening of the second exhaust valve within the compression stroke. Thus, the illustrated timing provide for increased intake manifold pressure and a small amount of EGR at lower engine speeds and loads. As the engine load and speed increase, the first opening of the second exhaust valve is advance to increase EGR flow to the engine cylinders. The second opening of the second exhaust valve causes less blowthrough air to be pumped to the engine intake because the second exhaust valve closes earlier in the compression stroke. However, intake manifold pressure may be kept at a higher pressure due to the increased EGR flow. Further, at part load, the engine tolerates higher EGR flow rates and may be less prone to misfire than at lower engine speeds and loads. Further, the EGR may help to suppress NOx formation in the engine cylinders as the engine load increases. The desired EGR fraction is increased in response to higher engine loads to suppress NOx formation in the engine cylinders.

At time T1, the engine load has reached a level where it may be desirable to further increase EGR flow to the engine since increasing EGR may limit engine power. The desired EGR fraction is decreased to improve engine output power and the EGR valve begins to be commanded increasingly closed.

Between time T1 and time T2, intake valve timing is further advanced to improve engine power output in response to the increasing engine load. Blowdown valve timing remains advanced so that exhaust gases may be evacuated from the cylinder at higher engine speeds. The first and second closing timing of the second exhaust valve are advanced, but EGR flow to the engine cylinders is reduced via at least partially closing the EGR valve. In this way, the EGR valve may limit flow of exhaust gas and air to the intake manifold at higher engine loads and speeds to improve engine power output. Because the cylinder is compressing air and EGR that enters the second exhaust manifold, EGR may flow to engine cylinders even at wide open throttle conditions. The amount of EGR that flows to engine cylinders at wide open throttle may be based on a compromise of power produced by the engine and engine emissions.

In this way, flow of EGR and blowthrough air to the engine intake from the second or scavenge manifold may be limited during some conditions (e.g., low engine speeds and loads) via exhaust valve timing. During other conditions (e.g., high engine speeds and loads), EGR and blowthrough air to the engine intake may be limited or controlled via an EGR valve.

Figure 6:
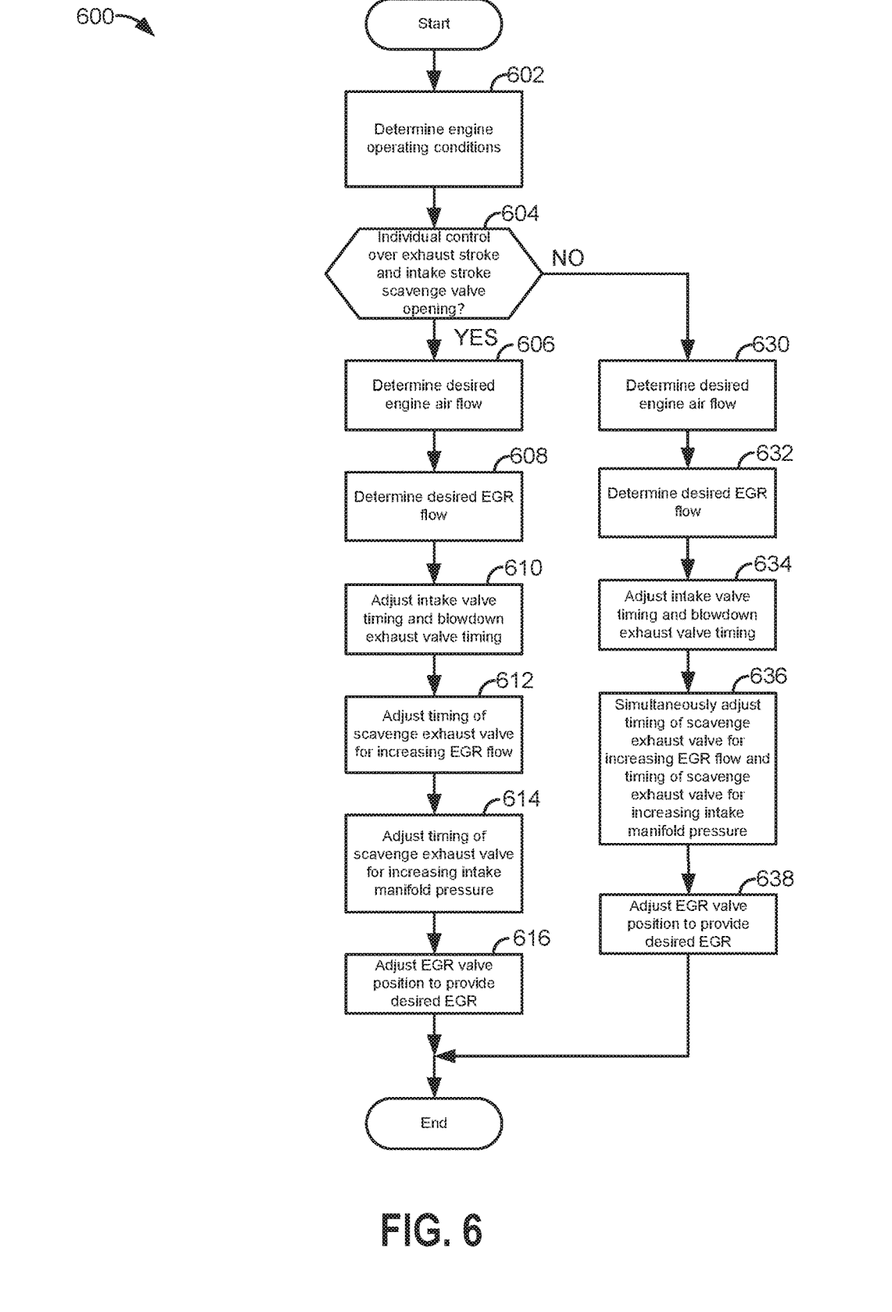
FIG. 6 shows an example method for operating an engine.

Referring now to FIG. 6, a method for operating an engine is disclosed. The method of FIG. 6 may be incorporated into the system of FIGS. 1-3B as executable instructions stored in non-transitory memory. Additionally, portions of the method of FIG. 6 may be actions performed via the controller 12 shown in FIGS. 1 and 2 to transform a state of a device or actuator in the real world.

At 602, method 600 determines engine operating conditions. Engine operating conditions may be determined via receiving input from one or more sensors as described in reference to FIGS. 1-3B. In one non-limiting example, method 600 may determine engine speed, engine load, and engine temperature. Method 600 proceeds to 604.

At 604, method 600 judges if the system includes individual control of intake, exhaust, and compression stroke opening of the scavenge exhaust valve (e.g., second exhaust valve 6). Individual control of the scavenge exhaust valve allows opening and closing of a first scavenge exhaust valve opening (e.g., opening of the scavenge exhaust valve for increasing EGR) to be adjusted independently from adjustments to a second scavenge exhaust valve opening (e.g., opening of the scavenge exhaust valve for increasing intake manifold pressure). Thus, if there is individual control over the first opening of the scavenge exhaust valve and the second opening of the scavenge exhaust valve, opening timing of the first opening of the scavenge exhaust valve may be advanced without advancing opening timing of the second opening of the scavenge exhaust valve. If method 600 judges that individual control of the scavenge exhaust valve is provided, the answer is yes and method 600 proceeds to 606. Otherwise, the answer is no and method 600 proceeds to 630.

At 606, method 600 determines a desired engine air flow rate. In one example, method 600 determines a desired engine torque in response to a position of an accelerator pedal and present vehicle speed. The desired engine torque is converted into a desired engine air flow that provides the desired engine torque. The desired engine air flow may be output from a table or function that is indexed via the desired engine torque. Values in the engine air flow table may be empirically determined and stored in controller memory. Method 600 proceeds to 608 after the desired engine air flow is determined.

At 608, method 600 determines a desired EGR flow rate. The desired EGR flow rate may be determined by indexing a table or function of empirically determined engine EGR flow rates. The table or function may be indexed via engine speed and engine load or engine torque. The table outputs a desired EGR flow rate. Method 600 proceeds to 610.

At 610, method 600 adjusts intake valve timing and blowdown exhaust valve timing. In one example, method 600 adjusts intake valve timing based on empirically determined intake valve timings stored in a table or function in controller memory. The table or function may be indexed via engine speed, engine load, and desired EGR flow. The table outputs intake valve timing (e.g., intake valve opening and/or closing timing) and the intake valves are commanded to the timing. Similarly, blowdown exhaust valve timing is adjusted based on empirically determined exhaust valve timings stored in a table or function in controller memory. The table or function may be indexed via engine speed, engine load, and desired EGR flow. The table outputs blowdown exhaust valve timing (e.g., exhaust blowdown valve opening and/or closing timing) and the exhaust blowdown valves are commanded to the timing.

In one example, at lower engine speeds and lower engine loads, the intake valve timing may be retarded as compared to intake valve timings at higher engine speeds and higher engine loads. The blowdown exhaust valve timing may be also be retarded as compared to blowdown exhaust valve timings at higher engine speeds and engine loads. Thus, intake valve timings and blowdown exhaust valve timing may be advanced in response to increasing engine speed and engine load. Method 600 proceeds to 612.

At 612, method 600 adjusts scavenging exhaust valve timing (e.g., opening and closing timings relative to crankshaft position) for increasing EGR flow. The scavenging exhaust valve timing for increasing EGR flow opens and closes between the exhaust stroke and the intake stroke (e.g., as shown in FIG. 4), and it may be referred to as the first opening of the scavenging exhaust valve during a cylinder cycle. In one example, at lower engine speeds and loads, the scavenging exhaust valve timing for increasing EGR flow is retarded at lower engine speeds and engine loads so as to reduce the amount of EGR flowing into engine cylinders when higher EGR rates may result in engine misfire. As engine speed and load increase, the scavenging exhaust valve timing for increased EGR flow may be advance to increase EGR flow into engine cylinders. Advancing the exhaust valve timing allows the cylinder to increase exhaust pressure in the scavenge manifold.

In one example, opening and closing timings for the scavenging exhaust valve timing are empirically determined and stored to a table or function in controller memory. The table or function may be indexed via engine speed, engine load, and desired EGR flow rate. The table or function outputs the opening and closing timings for the scavenging exhaust valve for increasing EGR flow to the engine. Method 600 proceeds to 614.

At 614, method 600 adjusts scavenging exhaust valve timing (e.g., opening and closing timings relative to crankshaft position) for increasing intake manifold pressure. The second scavenging exhaust valve opening allows engine intake manifold pressure to be increased since a portion of air entering the cylinder is returned to the engine intake, thereby matching the air charge in the cylinder to desired torque output of the cylinder. The scavenging exhaust valve timing for increasing intake manifold pressure opens and closes between the intake stroke and the compression stroke (e.g., as shown in FIG. 4), and it may be referred to as the second opening of the scavenging exhaust valve during a cylinder cycle. In one example, at lower engine speeds and loads, the scavenging exhaust valve timing for increasing intake manifold pressure is retarded at lower engine speeds and engine loads so as to increase the amount of air flowing from the cylinder back to the engine intake when higher intake manifold pressures may reduce engine pumping work while engine EGR tolerance may be low. As engine speed and load increase, the scavenging exhaust valve timing for increased intake manifold pressure may be advance to decrease air flow into engine cylinders when higher EGR amounts may be tolerated by the engine.

In one example, opening and closing timings for the scavenging exhaust valve timing are empirically determined and stored to a table or function in controller memory. The table or function may be indexed via engine speed, engine load, and desired EGR flow rate. The table or function outputs the opening and closing timings for the scavenging exhaust valve for increasing intake manifold pressure of the engine. Method 600 proceeds to 616.

At 616, method 600 adjusts a position of the EGR valve to control EGR flow to the engine and an amount of air recirculated through the cylinders and back to the engine intake. In one example, the EGR valve positions may be empirically determined and stored in a table or function in controller memory. The table may be indexed via engine speed, engine load, and desired EGR flow. In one example, values in the table may fully open the EGR valve at lower engine loads such that EGR flow and air flow back to the engine intake is controlled via scavenging exhaust valve timing. At higher engine loads, the EGR valve may be commanded to closed or only partially open so that the EGR valve controls EGR and air flow to the engine air intake at higher engine speeds and loads. This allows the scavenge exhaust valve timing to be at an advanced position so that the scavenge exhaust valve timing may be retarded if engine load decreases. Further, it allows EGR to be shut off quickly when high loads are reached without having to wait for camshaft to index. EGR flows to engine cylinders when the EGR valve is at least partially open at wide open throttle conditions. Method 600 commands exhaust valves, intake valves, and the EGR valves to the positions determined at 610-616. Method 600 proceeds to exit.

At 630, method 600 determines a desired engine air flow rate as previously described at 606. Method 600 proceeds to 632 after the desired engine air flow is determined.

At 632, method 600 determines a desired EGR flow rate as previously described at 608. Method 600 proceeds to 634.

At 634, method 600 adjusts intake valve timing and blowdown exhaust valve timing as previously described at 610. Method 600 proceeds to 636.

At 636, method 600 simultaneously adjusts scavenging exhaust valve timing for increasing EGR flow (e.g., first scavenging exhaust valve opening during a cylinder cycle) and scavenging exhaust valve timing for increasing intake manifold pressure (e.g., second scavenging exhaust valve opening during a cylinder cycle). In one example, at lower engine speeds and loads, the scavenging exhaust valve timing for increasing EGR flow and scavenging exhaust valve timing for increasing intake manifold pressure are retarded at lower engine speeds and engine loads so as to reduce the amount of EGR flowing into engine cylinders and increase intake manifold pressure when higher EGR rates may result in engine misfire. As engine speed and load increase, the scavenging exhaust valve timing for increasing EGR flow may be advance to increase EGR flow into engine cylinders and the scavenging exhaust valve timing for increasing intake manifold pressure may be advanced to reduce air flow to the engine intake. The scavenge exhaust valve timings may be simultaneously adjusted via adjusting a position of a single camshaft.

In one example, opening and closing timings for the scavenging exhaust valve timing are empirically determined and stored to a table or function in controller memory. The table or function may be indexed via engine speed, engine load, and desired EGR flow rate. The table or function outputs the opening and closing timings for the scavenging exhaust valve. Method 600 proceeds to 638.

At 638, method 600 adjusts a position of the EGR valve to control EGR flow to the engine and an amount of air recirculated through the cylinders and back to the engine intake. In one example, the EGR valve positions may be empirically determined and stored in a table or function in controller memory. The table may be indexed via engine speed, engine load, and desired EGR flow. In one example, values in the table may fully open the EGR valve at lower engine loads such that EGR flow and air flow back to the engine intake is controlled via scavenging exhaust valve timing. At higher engine loads, the EGR valve may be commanded to closed or only partially open so that the EGR valve controls EGR and air flow to the engine air intake at higher engine speeds and loads. This allows the scavenge exhaust valve timing to be at an advanced position so that the scavenge exhaust valve timing may be retarded if engine load decreases. Further, it allows EGR to be shut off quickly when high loads are reached without having to wait for camshaft to index. Method 600 commands exhaust valves, intake valves, and the EGR valves to the positions determined at 634-638. Method 600 proceeds to exit.

Thus, the method of FIG. 6 provides for an engine method, comprising: ejecting a first portion of exhaust gas from combustion in a cylinder during a cycle of the cylinder to an exhaust manifold, the cylinder included in a naturally aspirated engine; ejecting a second portion of exhaust gas from combustion in the cylinder during the cycle to a scavenge manifold; and ejecting fresh air from the cylinder to the scavenge manifold during the cycle of the cylinder. The method further comprises returning the second portion of exhaust gas and the fresh air to cylinders of the engine. The method includes where the exhaust gas and the fresh air is returned to the cylinders of the engine via a passage that enters an engine air intake upstream of a throttle. The method includes where the exhaust gas and the fresh air is at a pressure higher than atmospheric pressure. The method further comprises adjusting timing of a camshaft to vary the second portion of exhaust gas and the fresh air exiting the cylinder. The method includes where the fresh air has not participated in combustion in an engine. The method further comprises cooling the second portion of exhaust gas.

In some examples, the method of FIG. 6 provides for a method for a naturally aspirated engine, comprising: during a cycle of a cylinder, opening a scavenging exhaust valve a first time via a first cam lobe during an exhaust stroke of the cylinder, closing the scavenging exhaust valve during the exhaust stroke or during an intake stroke, opening the scavenging exhaust valve a second time via a second cam lobe during the intake stroke of the cylinder, and closing the scavenging exhaust valve during a compression stroke of the cylinder. The method further comprises adjusting timing of a camshaft that includes the first cam lobe and the second cam lobe. The method further comprises retarding the camshaft at a first engine speed and a first engine load and advancing the camshaft at a second engine speed and a second engine load, the second engine speed greater than the first engine speed. The method further comprises ejecting exhaust gas from the cylinder to a scavenge manifold while the scavenging exhaust valve is opened the first time, and ejecting fresh air from the cylinder to the scavenging manifold while the scavenging exhaust valve is opened the second time. The method further comprises returning the exhaust gas and the fresh air to an intake of an engine via the scavenging manifold. The method further comprises cooling the exhaust gas before the exhaust gas enters the intake. The method further comprises closing an EGR valve at engine loads higher than a threshold load.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. Further still, one or more of the illustrated steps may be omitted in some examples.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
ejecting a second portion of exhaust gas from combustion in a cylinder during a cycle of the cylinder to a scavenge manifold at a first time, the cylinder included in a naturally aspirated engine; and
ejecting fresh air from the cylinder to the scavenge manifold during the cycle of the cylinder at a second time, the second time different from the first time.

2. The method of claim 1, further comprising returning the second portion of exhaust gas and the fresh air to cylinders of the engine and ejecting a first portion of exhaust gas from combustion in the cylinder during the cycle of the cylinder to an exhaust manifold.

3. The method of claim 2, where the exhaust gas and the fresh air is returned to the cylinders of the engine via a passage that enters an engine air intake upstream of a throttle.

4. The method of claim 2, where the exhaust gas and the fresh air are at a pressure higher than atmospheric pressure.

5. The method of claim 1, further comprising adjusting timing of a camshaft to vary the second portion of exhaust gas and the fresh air exiting the cylinder.

6. The method of claim 1, where the fresh air has not participated in combustion in the engine.

7. The method of claim 1, further comprising cooling the second portion of exhaust gas.

8. A method for a naturally aspirated engine, comprising:
during a cycle of a cylinder, opening a scavenging exhaust valve a first time via a first cam lobe during an exhaust stroke of the cylinder, closing the scavenging exhaust valve during the exhaust stroke or during an intake stroke of the cylinder, opening the scavenging exhaust valve a second time via a second cam lobe during the intake stroke of the cylinder, and closing the scavenging exhaust valve during a compression stroke of the cylinder; and
ejecting exhaust gas from the cylinder to a scavenge manifold while the scavenging exhaust valve is opened the first time, and ejecting fresh air from the cylinder to the scavenging manifold while the scavenging exhaust valve is opened the second time.

9. The method of claim 8, further comprising adjusting timing of a camshaft that includes the first cam lobe and the second cam lobe.

10. The method of claim 9, further comprising retarding the camshaft at a first engine speed and a first engine load and advancing the camshaft at a second engine speed and a second engine load, the second engine speed greater than the first engine speed.

11. The method of claim 8, further comprising returning the exhaust gas and the fresh air to an intake of the engine via the scavenge manifold.

12. The method of claim 11, further comprising cooling the exhaust gas before the exhaust gas enters the intake.

13. The method of claim 12, further comprising closing an EGR valve at engine loads higher than a threshold load.

14. A system, comprising:
a naturally aspirated engine including an intake, a plurality of blowdown exhaust valves, and a plurality of scavenging exhaust valves;
an exhaust manifold coupled to the engine and in fluidic communication with the plurality of blowdown exhaust valves;
a scavenging manifold coupled to the engine, the scavenging manifold in communication with the plurality of scavenging exhaust valves;
an exhaust gas cooler coupled to the scavenging manifold;
an exhaust gas recirculation valve positioned in a passage between the exhaust gas cooler and the intake; and
a camshaft including one lobe for each of the plurality of blowdown exhaust valves and two lobes for each of the plurality of scavenging exhaust valves.

15. The system of claim 14, further comprising a controller including executable instructions stored in non-transitory memory for closing the exhaust gas recirculation valve at engine loads greater than a threshold.

16. The system of claim 15, further comprising additional instructions to advance the camshaft in response to an increase in engine load.

17. The system of claim 16, further comprising additional instructions to flow exhaust gas to engine cylinders at wide open throttle conditions.

18. The system of claim 14, further comprising an adjustable intake camshaft.

19. The system of claim 14, further comprising a throttle and an exhaust gas recirculation inlet, the throttle positioned upstream of the exhaust gas recirculation inlet.

* * * * *